United States Patent

[11] 3,620,550

| | | |
|---|---|---|
| [72] | Inventor | Richard J. Hornung<br>Spearville, Kans. 67876 |
| [21] | Appl. No. | 873,525 |
| [22] | Filed | Nov. 3, 1969 |
| [45] | Patented | Nov. 16, 1971 |

[54] DOUBLE-FOLD FRAME STRUCTURE
5 Claims, 11 Drawing Figs.

[52] U.S. Cl............................................. 280/476 A,
172/311, 280/36 A, 280/411 A
[51] Int. Cl............................................. B60d 1/14
[50] Field of Search............................................. 280/411.1,
411, 491.4, 476 A, 34, 36; 172/311, 456, 488

[56] References Cited
UNITED STATES PATENTS
2,620,200  12/1952  Anderson...................... 280/411.1
3,333,645  8/1967   Gustafson...................... 172/456
3,529,674  9/1970   Todd et al...................... 172/311

Primary Examiner—Benjamin Hersh
Assistant Examiner—Robert R. Song
Attorney—John H. Widdowson

ABSTRACT: This invention is a double-fold frame structure usable in farm machinery to support harrow tooth members and the like and movable from the extended earth-working condition through a series of folding maneuvers into a compact unit easily movable upon the highway, through gates, etc. More particularly, this invention is a frame structure to be pulled normally by a farm tractor including lift bar assemblies and pull bar assemblies to maintain a rigid structure when in the earth-working condition but permitting the same to be easily moved into a compact, transport condition with the aid of hydraulic control means.

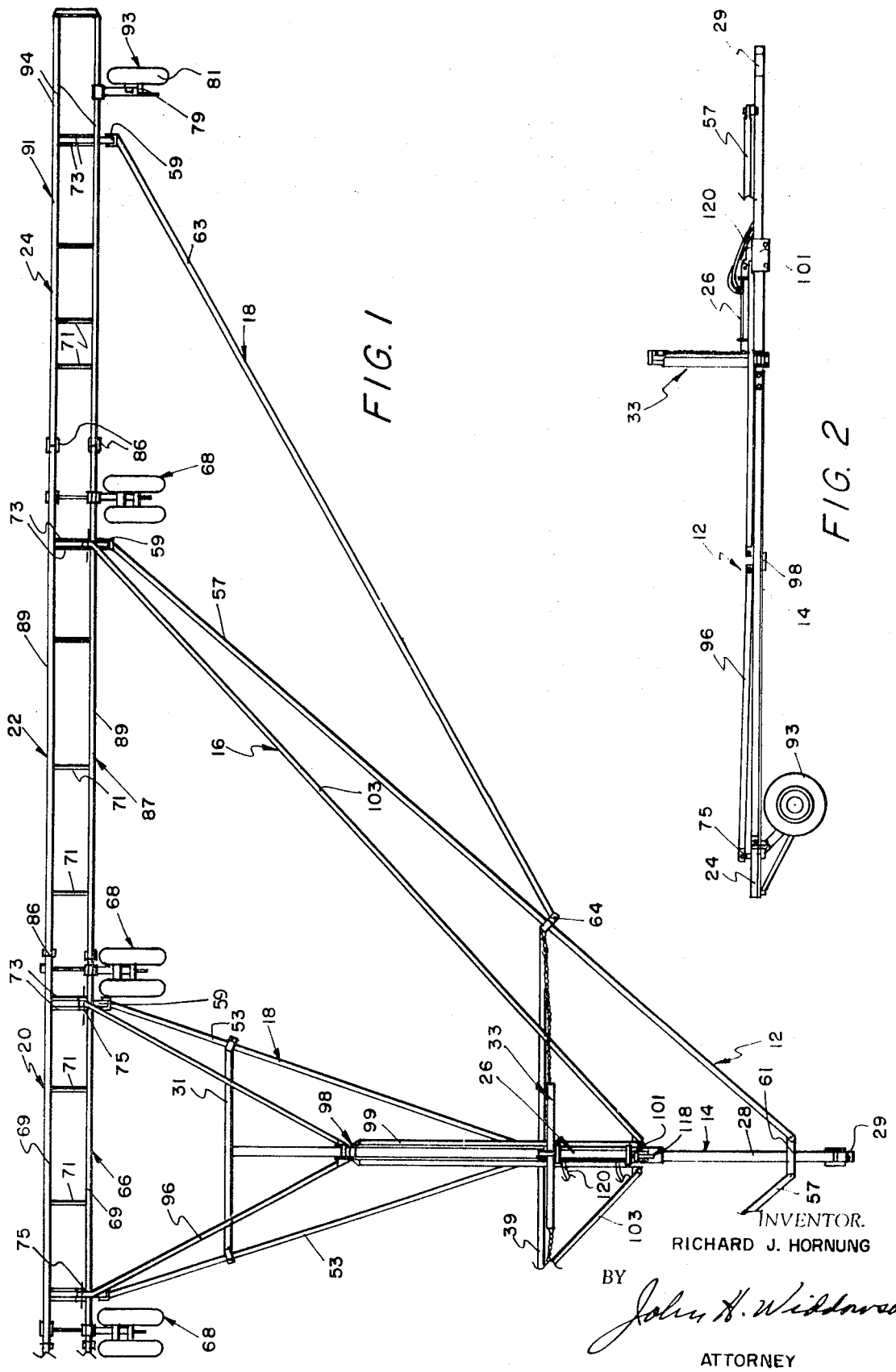

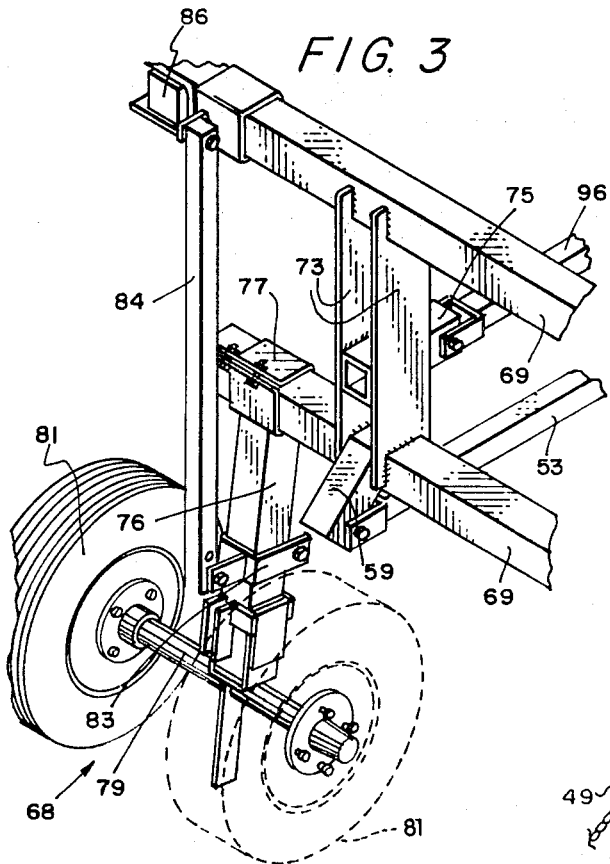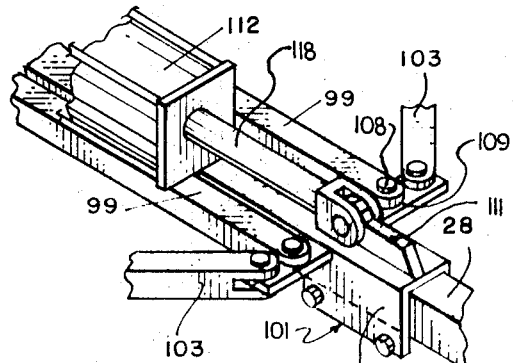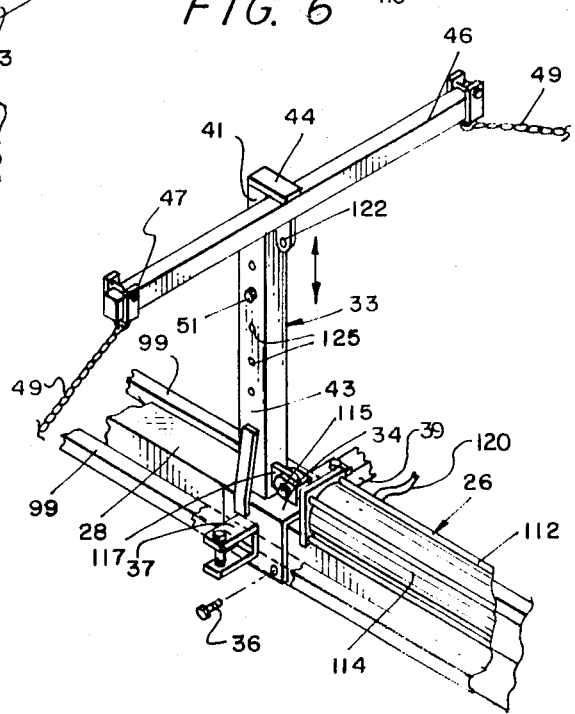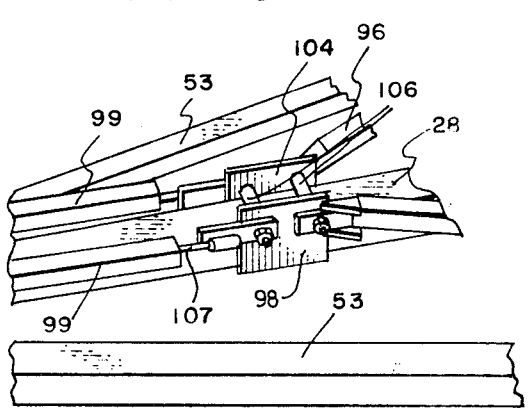

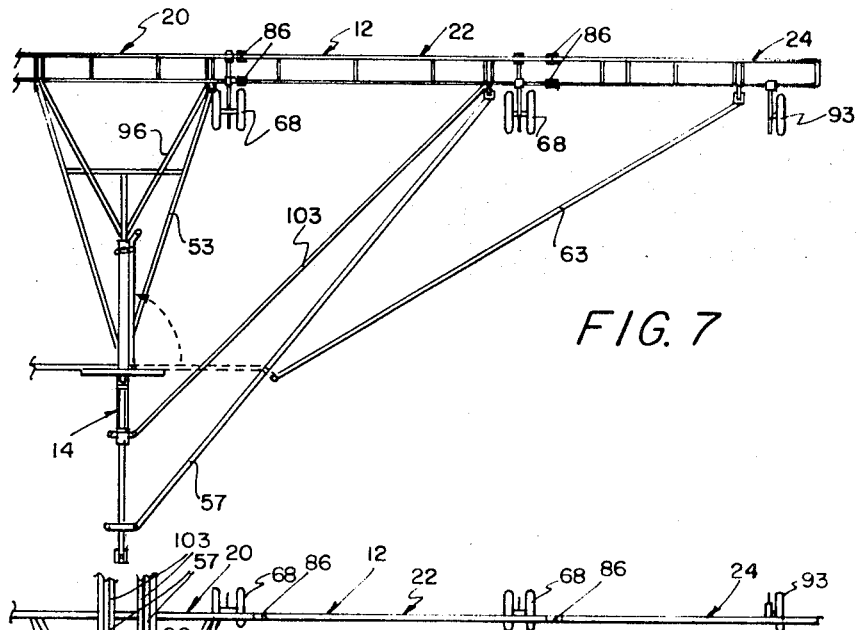
FIG. 7
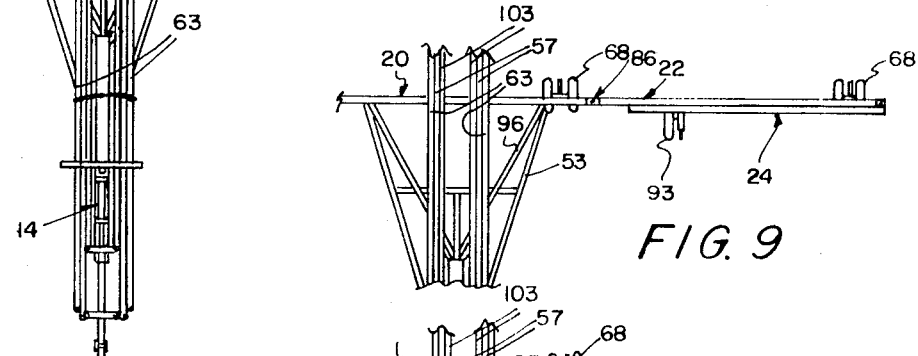
FIG. 8
FIG. 9
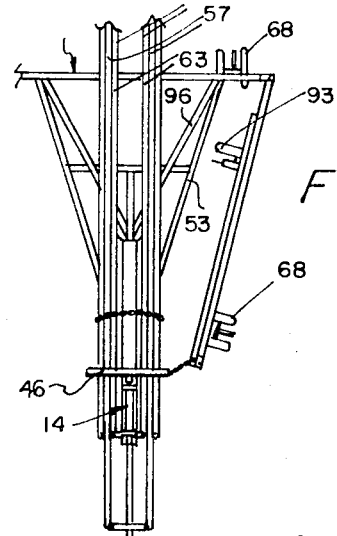
FIG. 10
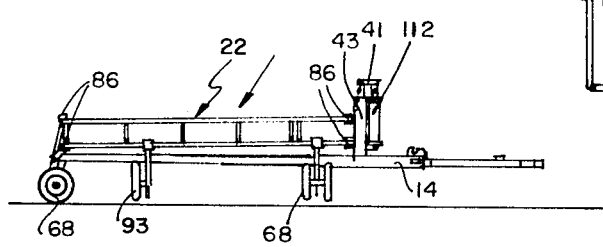
FIG. 11
INVENTOR.
RICHARD J. HORNUNG
BY
John H. Wilkinson
ATTORNEY

DOUBLE-FOLD FRAME STRUCTURE

Numerous types of frame structures are available in the prior art adapted to receive and support various types of farm cultivating tools having the same pulled by a tractor structure. Also, the prior art structures have folding-type assemblies so to be movable from a fully extended working condition to a folded condition for moving on highways, through gates, and the like. However, the prior art structures are not operable to provide a plurality of folding wing structures while achieving the necessary rigidity when, for example, the frame structure is extended into a working condition of approximately 60-80 feet wide. The prior art structures would require extremely heavy-duty tubing and frame elements in order to achieve such a working width and thus would not be efficient and effective due to the increased load and power requirements and handling by the operator would be almost impossible without complete power moving means. Additionally, the prior art devices are not of sufficient strength for the pulling while providing also a reactional force against lifting on working with the soil.

In one preferred embodiment of this invention, a double-fold frame structure is provided which is readily attachable to the hitch structure on a farm truck or, normally, a tractor for pulling the same in the extended, usage condition in fields for cultivating with the use of press wheel members, harrow tooth members, or the like. The double-fold frame structure includes a main attachment tongue assembly interconnected through a double lift bar assembly and a triple pull bar assembly to a central frame assembly; an intermediate wing assembly pivotally connected to each opposed end of the central frame assembly; and outer wing assembly pivotally connected to the outer respective ends of the intermediate wing assemblies; and a control means mounted on the tongue assembly. The main attachment tongue assembly includes an elongated tongue member having its forward end connected as by a hitch member to the tractor and the rearward end secured to a laterally extended support tubular member which, in turn, is secured to a portion of the triple pull bar assembly. The attachment tongue assembly further includes an upright vertical T-support assembly secured a central potion of the tongue member operable to maintain rigidity of the outer wing assemblies and provide means for elevating the entire frame structure. A pair of side bar braces are connected to the tongue member and an outer pair of pull bars for lateral rigidity. The central frame assembly includes a basic tool support assembly having outer portions thereof mounted on double wheel assemblies. Additionally, the outer ends of the basic tool support assembly are provided with pivotal connections to respective ones of the intermediate wing assemblies. Each intermediate wing assembly is provided with an intermediate tool support assembly having the outer ends connected to a double-wheel assembly for movement on a support surface. The outer ends of the intermediate tool support assemblies are pivotally connected to respective ones of the outer wing assemblies. The outer wing assemblies are each provided with an outer tool support assembly having an outer end portion carried upon the support surface by a single-wheel assembly. The triple pull bar assembly is provided with three sets of rearwardly extended divergent longitudinal pull bars pivotally connected at the outer ends to connector tubes anchored to the forward potion of respective ones of the aforementioned tool support assemblies. The outer sets of pull bars are connected by brace chain members to the vertical T-support assembly so that the same is adjustable to maintain the outer wing assemblies in proper alignment plus adding vertical support. The double lift bar assembly includes two sets of primary lift bars having the first set pivotally connected to upright support tubes connected to the central frame assembly and to a roller connector assembly which is mounted for longitudinal movement on the tongue member. From the roller connector assembly, a pair of strut bars extend forwardly and are interconnected to a slidable anchor assembly. A second set of lift bars are connected to the anchor assembly and to upright support posts on respective intermediate wing assemblies. The control means includes a piston and cylinder assembly having a stationary end connected to the vertical T-support assembly and a movable end connected to the slidable anchor assembly for movement thereof. The vertical T-support assembly is provided with telescoping tube members movable vertically relative to each other and anchored by a bolt member in an adjusted position. The piston and cylinder assembly is movable in a horizontal condition to pull the respective double lift bar assemblies forwardly so as to pivot the central frame assembly, intermediate wing assemblies, and outer wing assemblies forwardly about a horizontal axis. Next, the respective lift bar members and pull bar members may be disconnected and moved into overlapping engagement with the central frame assembly whereupon the respective outer wing assemblies can be moved so as to be in abutting adjacent engagement with the respective intermediate wing assemblies. Thereupon, the intermediate wing assemblies and adjacent outer wing assemblies are again folded inwardly towards the main attachment tongue assembly and connected by the brace chain members to a transversely extended upper support bar of the vertical T-support assembly. Next, the piston and cylinder assembly is pivoted about its stationary end upwardly and interconnected to the telescope portion of the vertical T-support assembly. Next, the upper telescope portion is lifted upwardly under hydraulic fluid to tilt upwardly the interconnected intermediate wing assemblies and outer wing assemblies so as to be transported on the highway while having a width only equal to that of the central frame assembly.

One object of this invention is to provide a double-fold frame structure overcoming the aforementioned disadvantages of the prior art structures.

One further object of this invention is to provide a double-fold frame structure having a main attachment tongue assembly interconnected to a central frame assembly which, in turn, is pivotally connected successively on opposite sides thereof to an intermediate wing assembly and an outer wing assembly whereupon these wing assemblies are movable into a double-fold condition abutting the central frame assembly so as to be compact for traveling on the highways, through gate areas, and the like.

Another object of this invention is to provide a double-fold frame structure having new and novel support means for interconnecting two wing assemblies to each side of a central frame assembly providing sufficient support for earth-working operations without the added requirement of heavy duty steel tubing, reinforcing, etc.

Still, one other object of this invention is to provide a double-fold frame structure having control means for pivoting the elongated working portions thereof about horizontal axes and subsequently pivoting the outer working portions about vertical axes into a compact condition and then having means for elevating the working portions so as to be readily movable over a support surface.

One further object of this invention is to provide a double-fold frame structure which is constructed of considerable working widths; economical to manufacture; readily movable with a minimum amount of effort from the fully extended working condition to the compact transport condition; substantially maintenance free; and providing the necessary strength and rigidity in the working condition regardless of soil conditions.

Various other objects, advantages, and features of the invention will become apparent to those skilled in the art from the following discussion, taken in conjunction with the accompanying drawings, in which:

FIG. 1 is a fragmentary top plan view of the double-fold frame structure of this invention;

FIG. 2 is a side elevational view of the double-fold frame structure of this invention illustrating the same in the earth-working condition;

FIG. 3 is an enlarged fragmentary perspective view illustrating a dual wheel support assembly of the double-fold frame structure of this invention;

FIG. 4 is a fragmentary perspective view of a vertical T-support assembly of the double-fold frame structure of this invention;

FIG. 5 is a fragmentary perspective view illustrating a roller connector assembly of the double-fold frame structure of this invention;

FIG. 6 is a fragmentary perspective view of a front anchor assembly of the double-fold frame structure of this invention; and FIG. 7-11, inclusive, are schematic diagrams illustrating the steps taken in achieving folding movement of the double-fold frame structure of this invention.

The following is a discussion and description of preferred specific embodiments of the new double fold frame structure of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, a double-fold frame structure 12 is illustrated with a portion broken away which indicates the considerable working widths which can be achieved by the frame structure 12 of this invention. It is obvious that the double-fold frame structure 12 can easily attached to a hitch member (not shown) on a farm wagon or truck but is normally attached to a tractor structure for pulling during earth-working operations. The double-fold frame structure 12 is illustrated without the attachment of harrow tooth members, press wheel members, or a seeding apparatus but it is understood that the same is adapted to receive any type of earth working equipment thereon as required.

The double frame structure 12 includes a main attachment tongue assembly 14 having the same connected through a double lift bar assembly 16 and a triple pull bar assembly 18 to a first central frame assembly 20; a pair of intermediate wing assemblies 22 connected to the respective outer ends of the central frame assembly 20; a pair of outer wing assemblies 24 pivotally connected to outermost ends of the respective intermediate wing assemblies 22; and a control means 26 operable to actuate the double lift bar assembly 16 and when folded, to elevate the intermediate wing assemblies 22 and the outer wing assemblies 24 for transport as will be explained.

The main attachment tongue assembly 14 includes a main tubular support tongue member 28 having its forward end connected to a hitch member 29 and the rearward end secured as by welding to a transversely extended support tube 31. In turn, the outer ends of the support tube 31 are secured to a portion of the triple pull bar assembly 18 as will be explained. Additionally, the attachment tongue assembly 14 includes an upright vertical T-support assembly 33 having a lower end thereof secured by a U-shaped clamp member 34 and bolt members 36 to a predetermined position axially on the tongue member 28.

More particularly as shown in FIG. 4, the vertical T-support assembly 33 is provided with laterally extended U-shaped clamps 37 on opposite sides of the clamp member 34 to receive side bar braces 39 pivotally connected thereto. A pair of upright telescoping actuator lift members 41 and 43 are mounted on the top surface of the clamp member 34 with the upper lift member 41 secured as by plate member 44 to a support bar member 46. The support bar member 46 extends laterally of the tongue member 28 and outer ends are each provided with U-shaped clamp members 47 to receive one end of a brace chain 49 for use in both the earth-working and conveyance condition as will be explained. The telescoping tube members 41 and 43 are moved relative to each other in a vertical direction by the control means 26 and locked by a bolt member 51 as will be explained.

As seen in FIG. 1, the triple pull bar assembly 18 includes a first pair of elongated pull bar members 53 having the rearward ends pivotally connected to a connector tube 59 secured to the central frame assembly 20 and forward ends secured to a midportion of the tongue member 28. Additionally, a mid- portion of the first pull bar members 53 are secured to the outer ends of the support tube 31. A pair of second pull bar members 57 of the triple pull bar assembly 18 includes the rearward ends connected to connector tubes 59 secured to the intermediate wing assemblies 22 and forward ends connected through an anchor clamp 61 to the tongue member 28. Next, a pair of third pull bar members 63 have their outer ends connected to connector tubes 59 on respective outer wing assemblies 24 and forward ends connected by slidable clamp members 64 to respective ones of the second pull bar members 57. Also, the slidable clamp members 64 are to receive the respective side bar braces 39 thereon.

It is seen that the combination of the triple pull bar assembly 18 provides attachment to the respective ones of the central frame assembly 20, intermediate wing assemblies 22, and outer wing assemblies 24 to achieve the necessary pull while maintaining the various elements in axial alignment for proper earth-working operations. It is also seen that brace chains 49 are secured to the outer respective ends of the support bar member 46 of the T-support assembly 33 to provide the necessary vertical strengthening to the outer interconnected pull bar members 57 and 63. Also, it is seen that the pair of folding side bar braces 39 are pivotally connected through the clamps 37 and the slidable clamp members 64 to provide the required lateral stability to the second and third pull bar members 57 and 63.

The central frame assembly 20 includes a main central tool support assembly 66 having opposite ends thereof supported upon respective dual wheel assembly 68. The central tool support assembly 66 includes a pair of parallel tool support bars 69 interconnected through spaced strut members 71 and adjacent parallel plates 73 having the connector tubes 59 plus upright support post members 75 mounted therebetween. The upright support post members 75 are spaced thereupon for attachment to the double lift bar assembly 16 in a manner to be explained.

As shown in FIG. 3, the dual wheel assembly 68 includes a main support shaft 76 secured through a clamp member 77 to the forward one of the central tool support bars 69 having its lower end connected to an axle member 79 which, in turn, has opposite ends secured to wheel members 81. A midportion of the support shaft 76 is connected as by a C-clamp member 83 to a connector link 84 which has its outer end connected to the rearward one of the central tool support bars 69. It is noted in FIG. 3 that the dual wheel assembly 68 is shown in the elevated or tool raised condition but the attachment through the connector link 84 moves the wheel members 81 forwardly on placing the parallel support bars 69 in the horizontal condition of FIG. 1. The connector link 84 provides the necessary vertical rigidity to the tool support assembly 66 when in the raised conveyance condition. Adjacent each double wheel assembly 68 is a pair of pivotal connector members 86 permitting pivotal movement of the respective intermediate wing assemblies 22 about a vertical axis when the central tool support assembly 66 is raised to the vertical condition of FIG. 3.

As each intermediate wing assembly 22 is identical, only one need be described in detail. The intermediate wing assembly 22 is provided with an intermediate tool support assembly 87 having its outermost end connected to one of the double wheel assembly 68 as previously described. The intermediate tool support assembly 87 is provided with a pair of elongated extended intermediate support bars 89 interconnected by the strut members 71 and the parallel plates 73 adjacent the double wheel assembly 68. The outer ends of the respective intermediate wing assemblies 22 are provided the pivotal connector members 86 for attachment to respective ones of the outer wing assemblies 24.

As the outer wing assemblies 24 are identical, only one need be described in detail. Each outer wing assembly 24 is provided with an outer tool support assembly 91 having the innermost end connected through the pivotal connector members 86 to the respective intermediate wing assemblies 22 with the outermost ends connected to a single wheel assembly 93. The outer tool support assembly 91 is provided with a pair of elongated outer support bars 94 interconnected by the strut members 71 and a pair of the plates 73. The single wheel assembly 93 is substantially identical to the previously described dual wheel assembly 68 except having a foreshortened axle member 79 with one wheel member 81 connected which provides the necessary vertical support.

The double lift bar assembly 16 includes a first set of lift bar members 96 having their outer ends pivotally connected to the upright support post members 75 on the central frame assembly 20 and the other ends are pivotally connected to a roller connector assembly 98 which, in turn, is connected as by rigid parallel strut bars 99 having their forward ends secured to a slidable anchor assembly 101. The slidable anchor assembly 101 is thereupon connected to a second set of lift bar members 103 having their outer ends pivotally connected to the upright support post members 75 on respective ones of the intermediate wing assemblies 22.

As best shown in FIG. 5, the roller connector assembly 98 is provided with a main U-shaped body member 104 mounted about the tongue member 28 and having its upper open portion interconnected through a pair of parallel roller members 106 to achieve axial movement on the tongue member 28. It is noted that the ends of the strut bars 99 are connected by thread screw members 107 to the main body 104 of the roller connector assembly 98 to provide for the proper adjustment to achieve the desired horizontal and vertical positioning of the frame and wing assemblies. The forward ends of the strut bars 99 are connected by bolt members 108 to the slidable anchor assembly 101.

As shown in FIG. 6, the slidable anchor assembly 101 is provided with a main body section 110 provided with a T-portion 109 to attach the aforementioned strut bars 99 and the second set of lift bar members 103. The body section 110 is slidably mounted on the tongue member 28 to provide for tilting of the frame structure 12 as will be explained. Additionally, the body section 110 is provided with an upright tab member 111 connectable to the control means 26.

The actuator control means 26 includes a main piston and cylinder assembly 112 having a cylinder member 114 pivotally connected through a bolt member 115 to a lower stud member 117 on the telescoping tube member 43 of the vertical T-support assembly 33. The main cylinder member 114 includes a piston therein (not shown) interconnected to an outer piston rod 118. It is noted that a pair of fluid lines 120 are connected to respective opposite ends of the cylinder member 114 for actuation in a substantial conventional manner as through a control lever (not shown) which would normally be mounted on the tractor structure. In the earth-working condition, the outer end of the piston rod 118 is pivotally connected to the upright tab member 111 upon the slidable anchor assembly 101 for movement longitudinally of the tongue member 28 in a manner to be described. The piston rod 118 may be readily disconnected from the slidable anchor assembly 101 and moved from the horizontal position of FIG. 4 to a vertically extended position and connected to a lift stud member 122 on the vertical T-support assembly 33 as shown in FIG. 10 for raising the intermediate wing assemblies 22 and outer wing assemblies 24 for transporting and storage purposes.

In the use and operation of the double-fold frame structure 12 of this invention, first assume the position as shown in FIG. 1 which is the fully extended condition required for earth-working operations. It is obvious that a plurality of tool implements such as double press wheels, parallel tooth members, and the like may be readily attached to respective ones of the tool support assemblies 66, 87, and 91. In this condition, the piston and cylinder assembly 112 of the control means 26 is in the fully retracted condition thereby placing the roller connector assembly 98 in its rearwardmost condition thereby acting through the pairs of lift bars 96 and 103 to pivot and maintain the respective sets of support bars 69, 89, and 94, in a common substantially horizontal plane, However, it is obvious that the piston and cylinder assembly 112 may be adjustable with lockpins so that an angle variance from the horizontal of the support assemblies 66, 87, and 91 may be achieved if desired.

In this working condition, it is seen that the brace chains 49 are attached to the outer slidable clamp members 64 to provide vertical rigidity to the connected respective second and third pull bars 57 and 63. The side bar brace members 39 are pivotally connected to the tongue member 28 and the slidable clamp members 64 to provide lateral stability. It is noted that the respective pivotal connector members 86 interconnecting respective ones of the intermediate wing assemblies 22 and outer wing assemblies 24 are in the horizontal condition whereupon any pivotal movement would have to be about a horizontal axis but the first and second lift bar members 96 and 103 operate to maintain the support assemblies 66, 87, and 91, in the generally horizontal condition. It is seen that the second and third pull bar members 57 and 63 are operable to maintain the wing assemblies 22 and 24 in substantial alignment with the central frame assembly 20.

As shown in FIGS. 7 to 11, inclusive, the first step of moving the double-fold frame structure 12 to the compact storage and travel condition is actuation of the piston and cylinder assembly 112 to operate through the dual lift bar assembly 16 to pivot the interconnected central frame assembly 20, intermediate wing assemblies 22, and outer wing assemblies 24, about a horizontal axis so as to be placed in the upright condition as viewed in FIG. 8. Next, it is obvious that the various ones of the pull bar members 57 and 63 of the triple pull bar assembly 18 are disconnected from the respective outer pivotal connections whereupon the same can be moved inwardly to be placed over the structure of the tongue assembly 14 and the central frame assembly 20. Also the side brace bar members 39 members 57 and 63 of the triple pull bar assembly 18 are disconnected from the respective outer pivotal connections Also the side brace bar members 39 are disconnected at their outer ends at the second pull bar members 57 so that it may be moved inwardly and secured as by a chain member to the tongue member 28 or the like. The next step is to disconnect the second lift bar members 103 from the respective intermediate wing assemblies 22 and place the same centrally and substantially aligned with the tongue member 28.

Next, the outer ends of respective ones of the outer wing assemblies 24 can be grasped and moved inwardly about the pivotal connector members 86 while supported on the single wheel assemblies 93 about 180° to the position shown in FIG. 9. When in this condition, the next step is to grasp the outer ends of the respective intermediate wing assemblies 22 and pivot the same with the adjacent outer wing assemblies 24 at least 90° inwardly towards the main attachment tongue assembly 14 as shown in FIG. 10.

For the next step, the respective abutting ends of the intermediate wing assemblies 22 and the outer wing assemblies 24 are positioned adjacent the outer respective ends of the support bar member 46 of the vertical T-support assembly 33. Then, the respective brace chains 49 are attached to the respective junctions of the intermediate wing assemblies 22 and the outer wing assemblies 24. Next, the piston and cylinder assembly 112 is disconnected from the slidable anchor assembly 101 and reconnected at its upper end to the support stud 122 on the vertical support assembly 33. Thereupon, it is obvious that the piston and cylinder assembly 112 can be actuated to move the piston rod 118 to elevate the interconnected telescoping tube member 41 to raise the dual wheel assemblies 68 and single wheel assemblies 93 of the intermediate wing assemblies 22 and outer wing assemblies 24, respectively, as shown in FIG. 11. On reaching this condition, it is obvious that the bolt member 51 can be mounted through aligned holes 125 in the telescoping tube members 41 and 43 for anchoring during transporting. While in this condition as shown in FIG. 10, it is obvious that the double-fold frame structure 12 achieves a width not greater than the central frame assembly 20 whereupon the same can be easily moved on highways, through gates, and the like.

It is seen that the double-fold frame structure of this invention provides the numerous supporting bars and tube members so as to achieve substantial vertical and horizontal rigidity when in the fully extended earth working condition not requiring substantial reinforcing members or heavy tube members to achieve the same. The vertical T-support assembly of the double-fold frame structure provides a new and novel structure for achieving both vertical and lateral stability to the outermost wing assemblies plus providing a means for elevating the same when in the double folded condition for transporting purposes. It is seen that the double-fold frame structure of this invention is rigid in construction, economical to manufacture, able to achieve a substantially greater width than the prior art structures, and easier to use and readily movable from the fully extended earth-working condition to a compact transporting condition.

While the invention has been described in conjunction with preferred specific embodiments thereof, it will be understood that this description was intended to illustrate the invention, which is defined by the following claims.

I claim:

1. A double-fold frame structure adapted to be pulled by a tractor structure, or the like comprising:
   a. a main attachment tongue assembly having one end connectable to the tractor structure and the opposite end connected to a central frame assembly by a pull bar assembly,
   b. an intermediate wing assembly connected to each respective end of said central frame assembly,
   c. an outer wing assembly connected to each respective outer end of said intermediate wing assemblies,
   d. a lift bar assembly connected to said central frame assembly to pivot same and said intermediate wing assemblies and said outer wing assemblies from a generally horizontal earth working position to a generally vertical position,
   e. the outer ends of said outer wing assemblies pivotal into abutting engagement with respective ones of said intermediate wing assemblies and adjacent central frame assembly for storage and transporting purposes
   f. a control means mounted on said attachment tongue assembly including a piston and cylinder assembly connected to said lift bar assembly movable from extended to retracted positions to pivot said central frame assembly, said intermediate wing assemblies, and said outer wing assemblies about a horizontal axis,
   g. said attachment tongue assembly having an elongated tongue member,
   h. said lift bar assembly secured to a connector assembly mounted on said tongue member for horizontal, axial movement,
   i. said connector assembly connected to said piston and cylinder assembly to move same axially on said tongue member for movement from extended to retracted positions.

2. A double-fold frame structure as described in claim 1, wherein:
   a. said attachment tongue assembly having said elongated tongue member with a vertical T-support assembly connected thereto, and
   b. said piston and cylinder assembly connected to said T-support assembly and said connector assembly to move said lift bar assembly longitudinally relative said tongue member to pivot said central frame assembly, said intermediate wing assemblies, and said outer wing assemblies about the horizontal axis.

3. A double-fold frame structure as described in claim 2, wherein:
   a. said T-support assembly having upright telescoping tube members and a transversely extended support bar secured to the upper one of said tube members, and
   b. said piston and cylinder assembly movable from a horizontal position to a vertical position connectable to said upper tube member for elevating same and interconnected ones of said intermediate wing assemblies and said outer wing assemblies to the transport condition.

4. A double-fold frame structure as described in claim 1, wherein:
   a. said pull bar assembly having pairs of pull bar members connected between said attachment tongue assembly and each respective one of said central frame assembly, said intermediate wing assemblies, and said outer wing assemblies, and
   b. said pull bar assembly further including rigid side brace bar members connected to said attachment tongue assembly and the outer ends of said brace bar members are secured at a common junction to said pull bar members attached to said intermediate and outer wing assemblies, respectively, to add substantial lateral stability thereto, and
   c. said tongue member having a transversely extended support tube secured to the outer ends, and
   d. said support tube having outer ends secured to said pull bar members attached to said central frame assembly to add lateral stability.

5. A double-fold frame structure as described in claim 4, wherein:
   a. said attachment tongue assembly including a vertically extended T-support assembly mounted on said tongue member, and
   b. said T-support assembly including a support bar extended transversely of said tongue member having outer ends respectively connected by brace chain members to the connection of said brace bar members and said pull bar members to achieve vertical support and stability.